United States Patent [19]

Kim

[11] Patent Number: 5,949,400
[45] Date of Patent: Sep. 7, 1999

[54] METHOD AND APPARATUS FOR CORRECTING A CHROMATICITY DIAGRAM BY A VARIABLE BRIGHTNESS

[75] Inventor: Eun-Sup Kim, Suwon, Rep. of Korea

[73] Assignee: SamSung Electronics Co., Ltd., Kyungki-do, Rep. of Korea

[21] Appl. No.: 08/770,513

[22] Filed: Dec. 20, 1996

[30] Foreign Application Priority Data

Dec. 20, 1995 [KR] Rep. of Korea ........................ 95-52585
Nov. 22, 1996 [KR] Rep. of Korea ........................ 96-56729

[51] Int. Cl.$^6$ ........................................ G09G 5/10
[52] U.S. Cl. .......................... 345/147; 348/645; 348/655; 348/808; 315/381
[58] Field of Search ...................... 345/145, 147, 345/157, 150, 153; 348/655, 657, 658, 793, 808, 809, 810, 815, 816, 645, 647, 649, 653; 315/381

[56] References Cited

U.S. PATENT DOCUMENTS 4,962,418 10/1990 Kamaga .
5,060,055 10/1991 Kim ........................................ 348/793
5,146,323 9/1992 Kobori et al. .
5,257,096 10/1993 Oshima .
5,303,071 4/1994 Kakimura .
5,311,294 5/1994 Cromer et al. .

*Primary Examiner*—Amare Mengistu
*Assistant Examiner*—Francis N. Nguyen
*Attorney, Agent, or Firm*—Robert E. Bushnell, Esq.

[57] ABSTRACT

An apparatus for correcting a chromaticity diagram by a variable brightness includes: a first grid voltage controller for controlling a first grid voltage to be a voltage of a predetermined level; a first grid voltage detector for detecting the first grid voltage output by the first grid voltage controller; a phase inverter for inverting a phase of a voltage signal detected by the first grid voltage detector; an analog-to-digital converter for converting the inputted voltage signal, which has been phase-inverted by the phase inverter, into a digital signal; a microprocessor for receiving the digital data of the first grid voltage output from the analog-to-digital converter to produce and output error data; a digital-to-analog converter for converting the error data supplied from the microprocessor into an analog signal, and a cut-off controller for receiving the analog signal output from the digital-to-analog converter and correcting a color-difference signal. The RGB characteristic changes and focus changes according to the first grid voltage changes are automatically corrected and color blur and visibility factor lowering can be prevented.

8 Claims, 7 Drawing Sheets

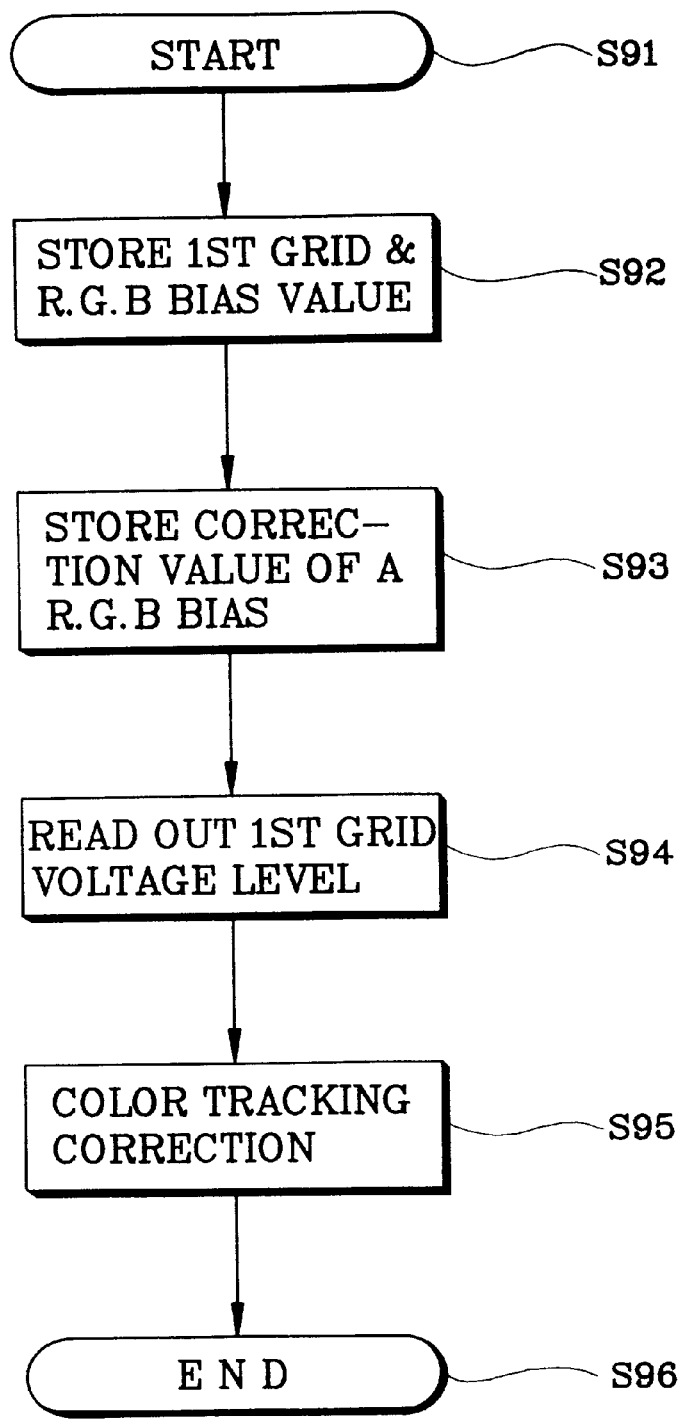

METHOD AND APPARATUS FOR CORRECTING A CHROMATICITY DIAGRAM BY A VARIABLE BRIGHTNESS

CLAIM OF PRIORITY

This application makes claims all benefits accruing under 35 U.S.C. §119 from an application for APPARATUS FOR CORRECTING CHROMATICITY DIAGRAM BY VARIABLE BRIGHTNESS AND METHOD THEREFOR earlier filed in the Korean Industrial Property Office on Dec. 20, 1995 and there duly assigned Ser. No. 52585/1995 and APPARATUS FOR CORRECTING CHROMATICITY DIAGRAM BY VARIABLE BRIGHTNESS AND METHOD THEREFOR earlier filed in the Korean Industrial Property Office on Nov. 22, 1996 and there duly assigned Ser. No. 56729/1996.

BACKGROUND OF THE INVENTION

1. Field of the Invention

The present invention relates, to a method and apparatus for correcting a chromaticity diagram by a variable brightness, and more particularly to a method and apparatus for correcting a chromaticity diagram by a variable brightness in which an error value with respect to a first grid voltage during the adjustment of the white balance is obtained by reading the first grid voltage of a cathode ray tube (CRT) to correct a chromaticity diagram of red, green and blue.

2. Description of the Related Art

In general, among various peripheral devices for processing information in a computer, a display monitor is a device for displaying information as an image on a screen. Such a display monitor represents an image by emitting a fluorescent material coated on a surface of a CRT by an electron beam controlled by an image signal.

In such display monitors, a brightness control, operated by a user, adjusts the brightness on the display monitor by adjusting the grid voltage on a first control grid as the CRT.

Unfortunately, changing the brightness produces errors in the chromaticity diagram of red, green and blue of the CRT and it is therefore necessary to correct the chromaticity diagram if proper color characteristics are to be maintained.

The following U.S. patents each disclose color correction apparatus having some features in common with the present invention. However, none of these references teaches or suggests the specifically recited combination of the present invention: U.S. Pat. No. 4,962,418 to Kamaga, entitled Color Picture Display Apparatus, U.S. Pat. No. 5,146,323 to Kobori et al., entitled Signal Processing Circuit Including A White Balance Adjusting Circuit In A Color Video Printer Apparatus, U.S. Pat. No. 5,257,096 to Oshima, entitled Monitor Television Receiver, U.S. Pat. No. 5,303,071 to Kakimura, entitled Color Corrector In An Apparuts For Producing Color Image, and U.S. Pat. No. 5,311,294 to Cromer et al., entitled Method And Apparatus For Setting The Color Balance Of A Color Display Device.

SUMMARY OF THE INVENTION

To overcome the above problems, it is an object of the present invention to provide an apparatus for correcting a chromaticity diagram by a variable brightness which detects a first grid voltage of a CRT to automatically correct a chromaticity diagram and focus according to the change of the detected voltage.

Accordingly, to achieve the above object, there is provided an apparatus for correcting a chromaticity diagram by a variable brightness which includes: a first grid voltage controller for controlling a first grid voltage to be a voltage of a predetermined level; a first grid voltage detector for detecting the first grid voltage controlled by the first grid voltage controller; a phase inverter for inverting a phase of a voltage signal output by the first grid voltage detector; an analog-to-digital converter for converting the supplied voltage signal which is phase-inverted by the phase inverter into a digital signal; a microprocessor for receiving the digital data signal of the first grid voltage output from the analog-to-digital converter and for producing an error data output: a digital-to-analog converter for converting the error data supplied from the microprocessor into an analog signal; and a cut-off controller for receiving the signal from the digital-to-analog converter and for correcting a color-difference signal.

Thus, the RGB characteristic change and focus change according to the first grid voltage change are automatically corrected and color blur and visibility factor lowering can be prevented.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 is a flowchart for explaining a method of correcting a chromaticity diagram by a variable brightness according to another embodiment of the present invention.

DETAILED DESCRIPTION OF THE PREFERRED EMBODIMENT

Figure 1:
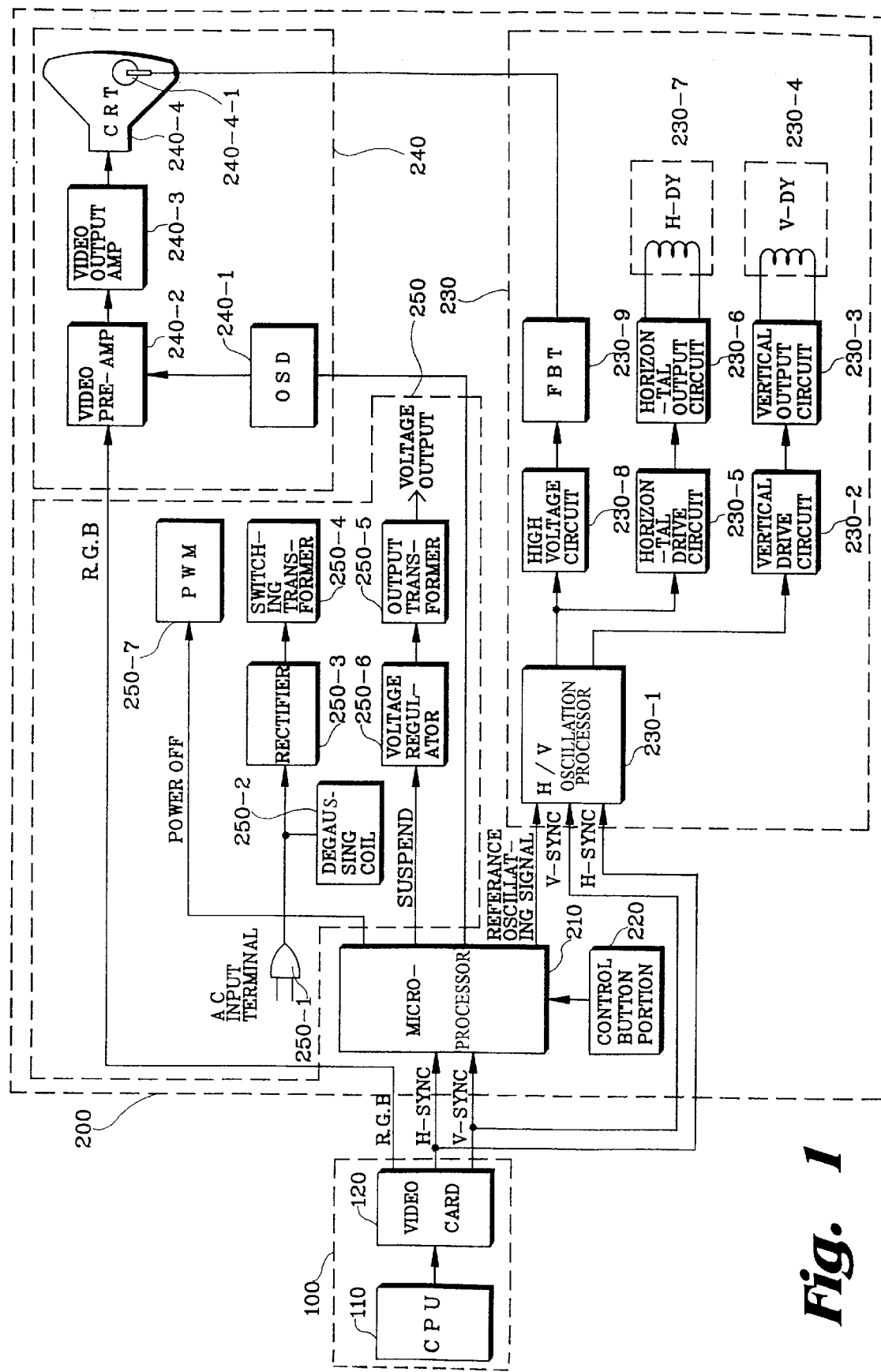
FIG. 1 is a block diagram of a display monitor.

FIG. 1 is a block diagram for illustrating an internal circuit of a display monitor. As shown in the drawing, a PC 100 comprises a CPU 110 for processing applied keyboard signals and for generating data according to the results of the processing, a video card 120 for processing the data output from the CPU 110 as an image signal of red, green and blue (RGB) and for outputting the RGB signal and a horizontal synchronous signal (H-sync) and a vertical synchronous signal (V-sync) to synchronize the processed RGB signal.

A monitor 200 for receiving the RGB signal output from the video card 120 in the PC 100 and the H-sync and V-sync signals comprises: a microprocessor 210 which receives the H-sync and V-sync signals; a control button portion 220 for generating screen control signals for controlling a monitor screen and for outputting the generated monitor screen control signals; a horizontal/vertical output circuit 230 for receiving the monitor screen control signals from the microprocessor 210 and a reference oscillation signal to synchronize raster; a video circuit 240 for receiving and displaying the image signals output from the video card 110, and a power supply 250 for supplying a driving power to the microprocessor 210, the horizontal/vertical output circuit 230 and the image signal processor 240.

In the monitor 200 having such a structure, the H-sync and V-sync signals output from the video card 120 are supplied to the microprocessor 210 including various monitor control data. When the monitor screen control signal is supplied from the control button portion 220, the microprocessor 210 outputs an image adjustment signal for adjusting an image displayed on a monitor screen, in response to the supplied screen control signal.

The control button portion 220 outputs a horizontal/vertical position control signal and a horizontal/vertical size adjustment signal. The microprocessor 210 receiving the monitor screen control signal outputs an image adjustment signal and the reference oscillation signal in response to the supplied monitor screen control signal. A horizontal/vertical oscillation signal processor 230-1 receiving the image adjustment signal and the reference oscillation signal output from the microprocessor 210 controls a switching speed of an on/off operation of a sawtooth oscillator circuit, in response to the H-sync and V-sync signals supplied from the video card 110.

A vertical pulse output from the horizontal/vertical oscillation signal processor 230-1 is supplied to a vertical drive circuit 230-2. As the vertical drive circuit 230-2 which receives the vertical oscillation signal, a single-step vertical amplifier is generally used and an emitter follower which supplies an input to a base of a transistor and outputs an output voltage from an emitter thereof is also widely used. Thus, an operation of linearly improvement rather than gain is made. A vertical output circuit 230-3 which receives an current signal output from the vertical drive circuit 230-2 generates sawtooth wave current matching the vertical synchronous pulse flowing through a vertical deflection yoke V-DY 320-4, according to which a vertical scanning period is determined. Also, the horizontal oscillation signal output from the horizontal/vertical oscillation signal processor 230-1 is supplied to a horizontal drive circuit 230-5.

The horizontal drive circuit 230-5 receiving the horizontal oscillation signal provides current enough to turn on/off a horizontal output circuit 230-5. In such a horizontal drive circuit 230-5, a same phase (same polarity) type that an output port becomes on when a drive port is on and a currently using reverse phase (reverse polarity) type that the output port becomes off when the drive port is on.

The horizontal output circuit 230-6 which receives the current output from the horizontal drive circuit 230-5 outputs a sawtooth-wave current to a horizontal deflection yoke H-DY 230-7, by which a horizontal scanning period is determined. To provide a stable DC voltage to an anode of a CRT 240-4, a feedback collector is used through a flyback transformer (hereinafter, called an FBT) 230-9 and a harmonic wave from leakage inductance and distribution capacity of a high voltage circuit 230-8 is used, to thereby generating quite a high voltage while a collector pulse is small. Accordingly, the high voltage is supplied to an anode 240-4-1 of the CRT 240-4.

Such a CRT 240-4 inside the image signal processor 240 displays image signals as follows. An OSD unit 240-1, to which an OSD gain signal generated according to a screen control via the microprocessor 210 is supplied, generates and outputs the OSD gain signal. The OSID gain signal output from the OSD unit 240-1 and the RGB signals supplied from the video card 120 are supplied to a video pre-amp 240-2 which maintains a particular voltage level by amplifying a low ROB signal using a low-voltage amplifier.

For instance. a signal under 1 Vpp is amplified to a signal of 4–6 Vpp. A video output amp 240-3 amplifies the signal of 4-GVpp to a signal of 40–60 Vpp to provide energy to each pixel. The amplified image signal in the video main amp 240-3 is supplied to a cathode of the CRT 240-4 to display the RGB signal via a monitor screen. The power supply 250 for providing a driving voltage to display the RGB signal receives AC via an AC input terminal 250-1. A degaussing coil 250-2 receives the AC output through the AC input terminal 250-1 and performs an action of restoring Into the original chromaticity a chromaticity blur Mate of chromaticity of the monitor screen occurring due to external conditions or due to the earth's magnetism.

When AC power is instantly supplied to the degaussing coil 250-2 for 2–8 seconds to perform such an action, the chromaticity blur state is restored by disturbing the magnetic system formed by a shadow mask inside the monitor. Also, the AC output through an AC rectifier 250-3 is rectified by the rectifier 250-3 and, supplied to a switching transformer 250-4. The switching transformer 250-4 receives DC supplied through the rectifier 250-3 and performs a switching action to provide various needed driving voltages to the monitor 200 including the voltage generated by the output transformer 250-5 via the voltage regulator 250-6.

If the V-sync is not supplied from the video card 120, the microprocessor 210 supplies a suspend mode signal to a voltage regulator 250-6 to block a deflecting voltage. A pulse width modulation unit 250-7 operates an on/off drive action of the switching device by a rectangular wave and the change of a pulse width increase/decreases conduction time to stabilize the output voltage. Also, when the microprocessor 210 does not detect the H-sync and V-sync. the microprocessor 210 applies a power-off mode signal. The element inside of the PWM unit 250-7 which receives the power-off mode signal is placed in a low level state to block the voltage supplied inside the monitor 200. Thus, the power consumed by the monitor 200 can be reduced.

The internal structure of the CRT 240-4 of a display monitor will be described with reference to the attached drawings.

Figure 2:
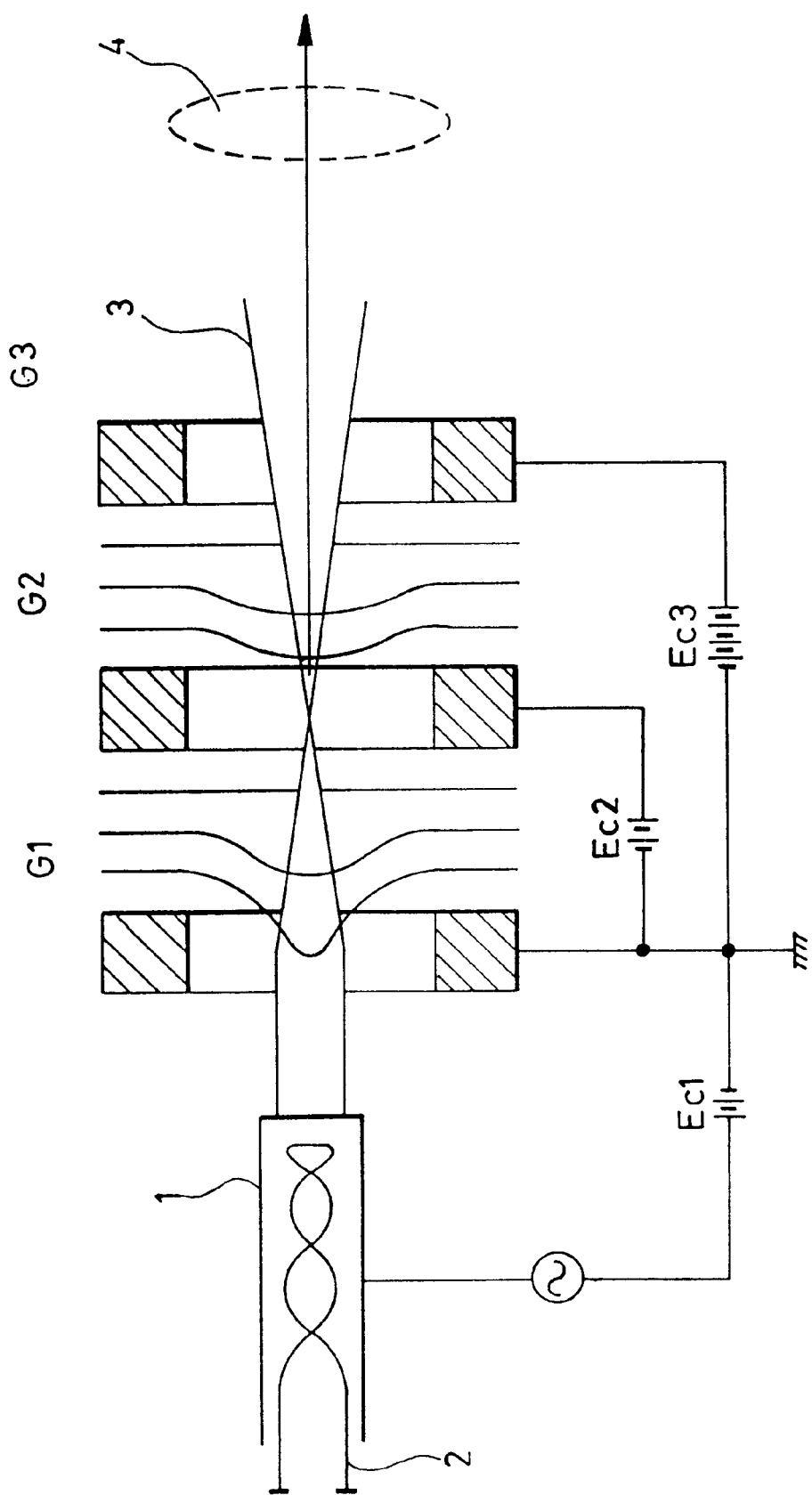
FIG. 2 is a sectional view of the inside of a CRT of the display monitor of FIG. 1.

FIG. 2 is a sectional view of the internal structure of the CRT of the display monitor shown in FIG. 1. As shown in FIG. 2, in the CRT 240-4 (FIG. 1), an electron beam 3 is generated by a cathode 1 heated to a temperature of about 700° C. by a heater 2. The electron beam 3 is generated by an electric field on a surface of the cathode 1 by supplying a voltage of Ec2 to a second grid G2.

A sub-voltage is supplied to a first grid G1 in relation to the cathode 1. When the sub-voltage is supplied to the first grid G1, the electrical potential thereof changes along with the electric field of the cathode surface. As a result, the amount of electrons emitted by the cathode 1 changes so that the current of the electron beam 3 changes. According to the change of the electron beam 3, the brightness changes.

Also, the electron beam 3 passed through the first grid G1 concentrates on a focus point by the voltage supplied to the second grid G2 and then passes therethrough. Thereafter, the electron beam diverges and concentrates on a fluorescent surface by a main focusing electron lens 4. Then. the electron beam 3 is deflected by a deflection yoke (see FIG. 1) and illuminates as it collides against a fluorescent material while scanning the entire surface of the CRT 240-4.

As the electrical potential of the first grid G1 installed at the cathode 1 gradually becomes negative, the electric field of the cathode surface becomes negative and the emission of the electron beam 3 gradually lessens until there is no emission. This state is called "cut off," and a voltage supplied between the cathode 1 and the first grid G1 is called a cut-off voltage. Also, when the voltage of the grid G2 changes, the electron beam 3 cuts off, and the cut-off voltage changes. Simultaneously, the characteristic of the electron lens 4 defined by the cathode 1 and the grid G1 and grid G2 changes as does the size of diameter of a surface of the electron beam contacting the surface of the fluorescent material. The focusing characteristic of light emitted by the fluorescent surface of the CRT 240-4 changes. In the chromaticity CRT 240-4, there is an electron beam of RGB relating to chromaticity and only the cathode 1 of the electron beam is exposed to the outside as being divided by each chromaticity to apply voltage from the outside.

As described above, in a state where a particular voltage is supplied to the cathode 1 exposed to the outside of the CRT 240-4 and the grid G1 and grid G2, the voltage of the grid G1 can be changed by a user. Accordingly, the characteristic of the electron lens 4 changes along with chromaticity diagram and focus changes. Thus, the chromaticity diagram and the focus should be corrected as the voltage of the grid G1 changes.

Figure 3:
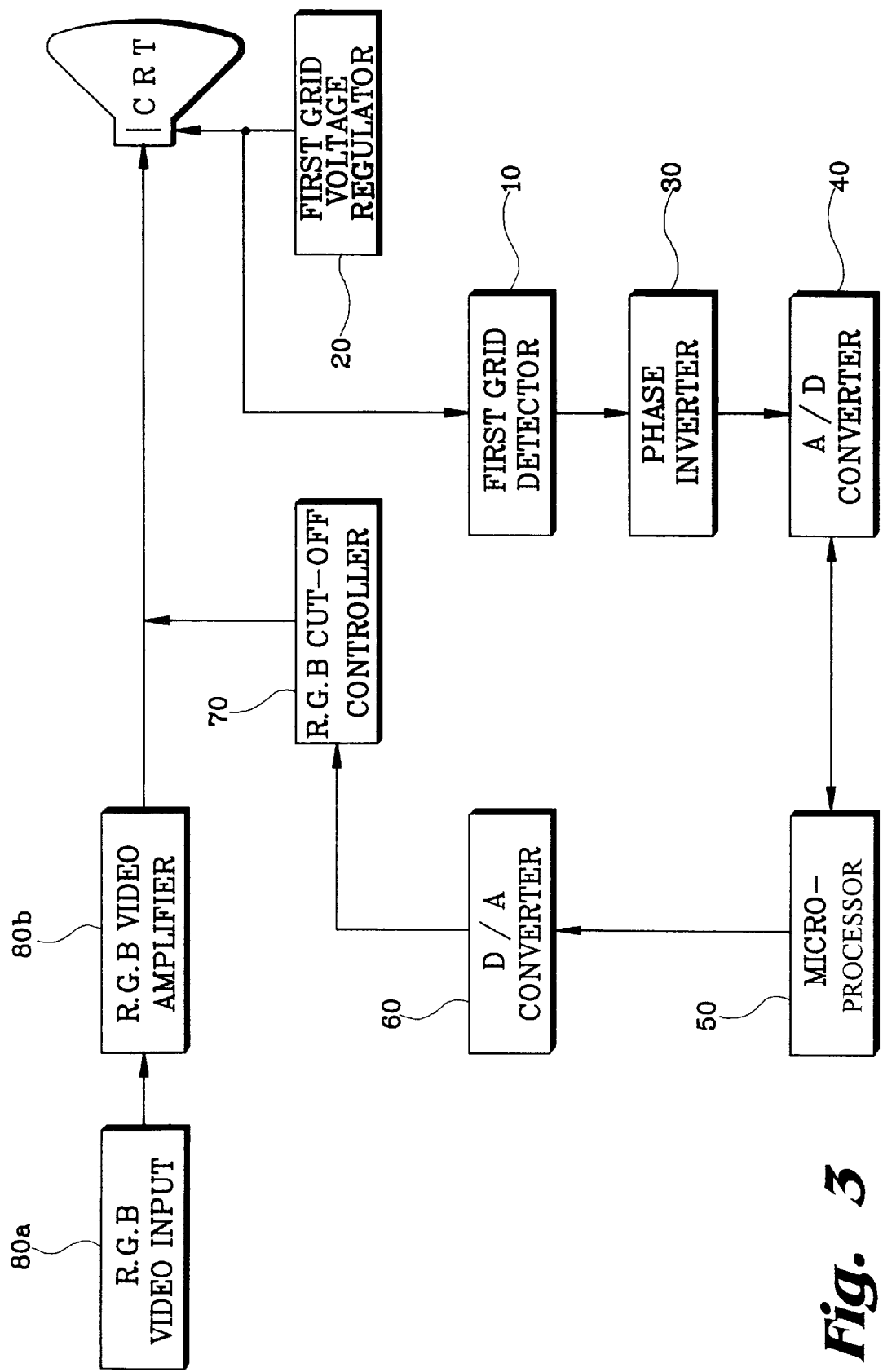
FIG. 3 is a block diagram of an apparatus for correcting a chromaticity diagram by a variable brightness according to an embodiment of the present invention.

Referring to FIG. 3, an apparatus for correcting a chromaticity diagram by a variable brightness according to an embodiment of the present invention comprises, a first grid voltage regulator 20 for controlling a level of a first grid (G1) voltage of a CRT: a first grid G1 voltage detector 10 for detecting the G1 voltage converted by the G1 voltage regulator 20; a phase inverter 30 for inverting the phase of a voltage signal according to the detection voltage detected by the first grid G1 voltage detector 10; an A/D converter 40 for converting the voltage signal, which is phase inverted by the phase inverter 30, into a digital signal; a microprocessor 50 for receiving the digital data of the G1 voltage output from the A/D converter 40 to output error data; a D/A converter 60 for receiving the error data supplied by the microprocessor 50 and converting it into an analog signal, and a cut-off controller 70 for receiving the signal from the D/A converter 60 to correct a color-difference signal.

The circuit having such a structure will now be described in detail with reference to the attached drawings.

Figure 4:
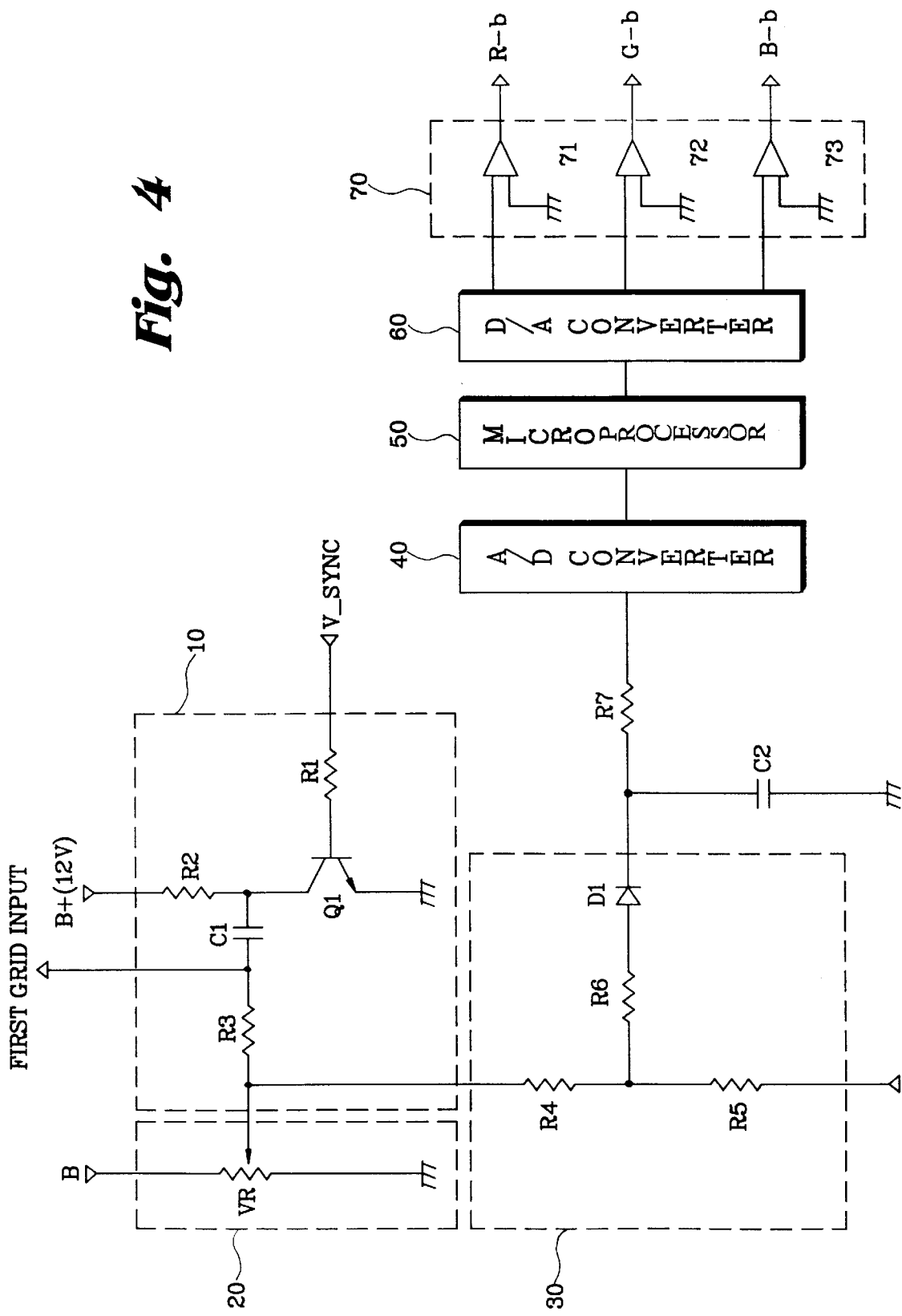
FIG. 4 is a circuit diagram detailing the block diagram shown in FIG. 3.

As shown in FIG. 4, the first grid G1 voltage regulator 20 is comprised of a variable resistor VR connected to a resistor R3 of the first grid G1 voltage detector 10. The G1 voltage detector 10 which detects a G1 voltage signal controlled by the G1 voltage regulator 20 is comprised of a transistor Q1 having a vertical synchronous signal V-sync supplied via a resistor R1 to its base, a resistor R2 and a capacitor C1 which are connected to a collector of the transistor Q1, and a resistor R3 connected to the capacitor C1.

In the G1 voltage detector 10 structured as above, the phase inverter 30 is comprised of resistors R4–R6 for dividing the voltage connected to the resistor R3 of the G1 voltage detector 10, and a diode D1. The A/D converter 40, which converts the voltage signal which is phase-inverted in the phase inverter 30 into a digital signal, is connected to the microprocessor 50 which receives the digital data of the G1 voltage output from the A/D converter 40 to output error data. The microprocessor is connected to the D/A converter 60 which receives the error data supplied from the microprocessor 50 and converts it into an analog signal. The cut-off controller 70 which receives the signal from the D/A converter 60 and corrects a color-difference signal is comprised of comparison operational amplifiers 71–73.

The operation of a preferred embodiment of the present invention having such a structure will now be described as follows.

As shown in FIG. 3, RGB signal output from a computer (not shown) is supplied to an RGB video input portion 80a. The supplied RGB signal is supplied to an RGB video amplifier 80b, to be amplified and supplied to the CRT to thereby display an image. The transistor Q1 of the G1 voltage detector 10 receives a positive V-sync at the base thereof via the resistor R1, which makes the Q1 conductive. Thus, the collector the transistor Q1 becomes grounded and the voltage signal input from the G1 makes the capacitor C1 discharge.

When the V-sync is not input, the G1 voltage signal is transmitted to the variable resistor VlR of the G1 Voltage regulator 20. Here, the G1 voltage of the CRT is synthesized with the V-sync by the G1 voltage detector 10 to remove feedback. The G1 voltage signal removed of the feedback is transmitted to the phase inverter 30 to thereby be converted into a positive signal. The resistors R4–R6 convert the inputted signal into a signal of 0–5 V by distributing the G1 voltage having a negative value.

Figure 5A:
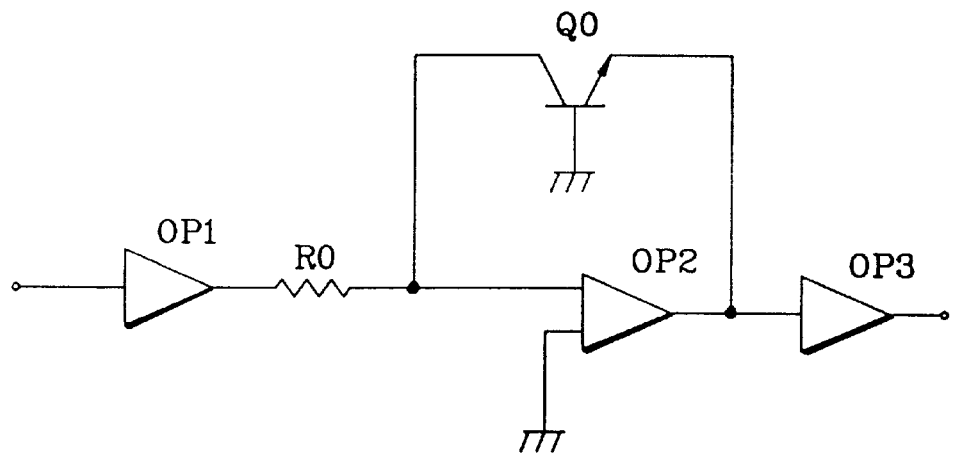
FIG. 5A and 5B are circuit diagrams showing a first embodiment of a phase inverter according to an embodiment of the present invention.
Figure 5B:
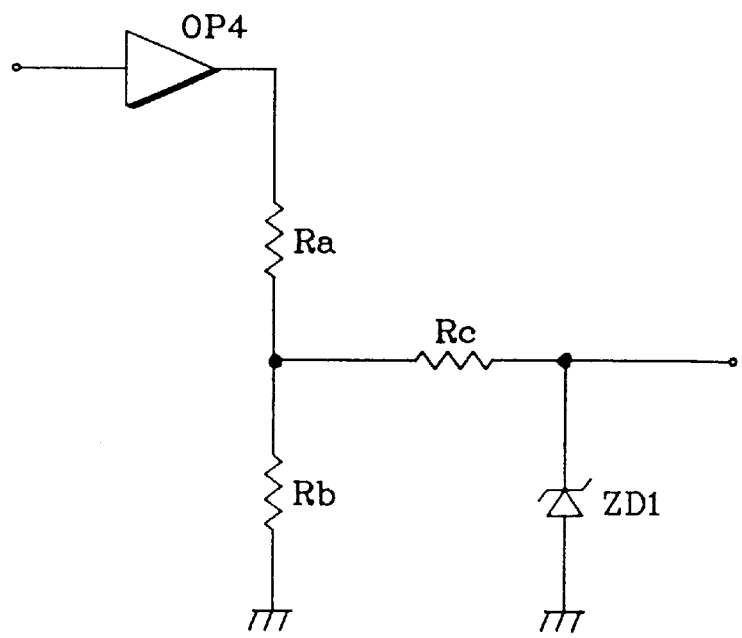

Though the phase inverter 30 includes a plurality of resistors R4–R6 and the diode D1 in the present invention. any device capable of converting a negative voltage into a positive voltage, such as operational amplifier, can be used as well. An example of the above is shown in the attached drawings. FIGS. 5A and 5B are circuit diagrams showing a first preferred embodiment of the phase inverter according to an embodiment of the present invention.

As shown in FIG. 5A, the phase inverter 30 includes a first operational amplifier OP1, a resistor R0 connected in series to the OP1, a second operational amplifier OP2 whose input terminals are connected to the resistor R0 and ground, a transistor Q0 connected between the input and output terminals of the amplifier OP2, and a third operational amplifier OP3 connected to the output of the amplifier OP2.

As shown in FIG. 5B, the phase inverter 30 can also includes a fourth operational amplifier OP4, resistors $R_a$ and $R_b$, connected in series to the output terminal of the OP4, a resistor $R_c$ connected between the resistors $R_a$ and $R_b$ and a Zener diode ZD1 connected to the resistor $R_c$.

The G1 voltage signal which is phase-inverted by the phase inverter 30 passes a low pass filter including a resistor R7 and a capacitor C2 to remove low frequency noise. Then, the G1 voltage signal is input to the A/D converter 40 to thereby be converted into a digital value.

The microprocessor 50 receives, the digital data of the G1 voltage and takes an absolute value by adding the received digital data of the G1 voltage to that in a white balance adjustment when the received digital value is greater than that in a white balance adjustment. Then, a chromaticity diagram of RGB renders a pulse width modulation signal by the absolute value, and is input to the D/A converter 60 to be converted into an analog signal, thereby to be input to the cut-off controller 70. At this stage, the output signal of the comparison-operational amplifiers 71–73 included in the cut-off controller 70 changes a bias voltage of an RGB electron gun (not shown) to correct color tracking.

When the digital value of the G1 voltage is less than that in a white balance adjustment an absolute value is taken by subtracting the digital data of the G1 voltage in a white balance adjustment from the digital data of the G1 voltage. Then, the chromaticity diagram is corrected by performing subtraction to the chromaticity diagram of RGB with the absolute value. The chromaticity diagram corrected as above becomes a pulse width modulation signal and is converted into an analog signal via the D/A converter 60 to be input to the cut-off controller 70. Here, the output signals of the comparison-operational amplifiers 71–73 of the cut-off controller 70 change the bias voltage of the RGB electron gun to correct color tracking.

Another preferred embodiment of a method of correcting a chromaticity diagram by a variable brightness will now be described as follows.

FIG. 6 is a flowchart for explaining the method of correcting a chromaticity diagram by a variable brightness according to another embodiment of the present invention. As shown In FIG. 6, the flowchart includes a step S91 of adjusting white balance to correct a chromaticity diagram by a variable brightness, a step S92 of storing the G1 voltage value and a reference RGB bias value during the white balance, a step S93 of reading the G1 voltage value and storing a correction value of the RGB bias according to a G1 voltage change rate when the G1 and RGB bias value is stored in step S92, a step S94 of reading the G1 voltage value which currently operates when the RGB bias correction value is stored in step S93, a step S95 of reading each correction value of the corresponding RGB bias assigned by the G1 voltage change rate when the G1 voltage value is read in step S94, and adding the same to the currently-operating RGB bias value so that color tracking is corrected by changing the bias voltage, and a step S96 of completing the correction of the chromaticity diagram by a variable brightness when the color tracking correction is completed in step S95.

The operation of an apparatus for correcting a chromaticity diagram by a variable brightness having such a structure is as follows.

White balance is adjusted to correct a chromaticity diagram by a brightness in step S91. Here, the G1 voltage value and the RGB bias value are stored in step S92 during the white balance adjustment. When the G1 voltage and RGB bias values are stored in step S92, the G1 voltage value is read in step S93 to produce and store the correction value of the RGB bias according to the G1 voltage change rate. When the RGB bias correction value is produced in step S92, a G1 voltage value which performs an electron beam control work at the CRT in step S94, is read.

When these steps are completed, the step S95 reads the G1 voltage value in step S94. When the G1 voltage value is read, each correction value of the corresponding RGB bias assigned by the G1 voltage change rate and the read value is added to the currently operating RGB bias value so that the bias voltage changes to thereby correct the color tracking. When the correction of the color tracking is completed, the chromaticity diagram correction by a variable brightness is completed.

The chromaticity diagram by a color tracking will be described with reference to the attached drawings.

Figure 7:
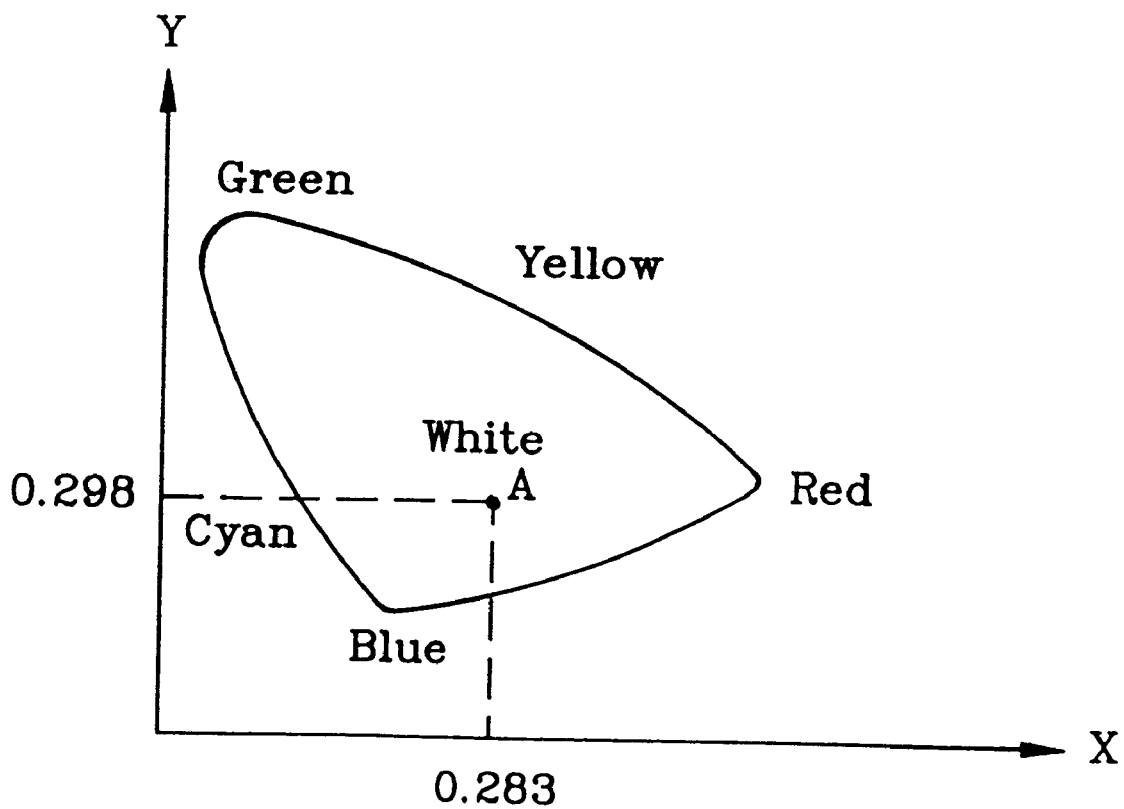
FIG. 7 is a graph indicating a chromaticity distribution represented on a planar surface.

FIG. 7 shows a distribution of chromaticity on a planar surface. As shown in the drawing, a point "A" denotes a white chromaticity diagram and the Kelvin temperature at this time is generally 9800° C. The chromaticity temperature is preferably white enabling a transfer of energy. When the chromaticity diagram is adjusted to X=0.283±0.02, Y=0.298±0.02 to obtain pure white.

Also, with a standard of the Kelvin temperature, a higher Kelvin temperature approaches blue and a lower Kevin temperature approaches red. According to the Kelvin temperature, cyan and green regions are approached. Thus, by changing a mixing ratio of Red, Green and Blue, the chromaticity signal can be controlled according to the temperature. Namely, the chromaticity diagram can be corrected by controlling the chromaticity signal using the chromaticity diagram by a variable brightness.

As described above, in the present invention, the chromaticity diagram and focus are automatically corrected according to the G1 voltage change of the CRT and thus the RGB characteristic change and focus change according to the G1 voltage change are automatically corrected. Therefore, color blur and visibility factor lowering can be prevented.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for correcting a chromaticity diagram by a variable brightness comprising:
    a first grid voltage controller generating a first grid voltage and for controlling said first grid voltage to be a voltage of a predetermined level;
    a first grid voltage detector for detecting the first grid voltage generated by said first grid voltage controller;
    a phase inverter for generating a phase inverted voltage signal by inverting a phase of the first grid voltage detected by said first grid voltage detector;
    an analog-to-digital converter for converting said phase inverted voltage signal into a digital signal;
    a microprocessor for receiving said digital signal to produce and output error data;
    a digital-to-analog converter for converting the error data, output from said microprocessor, into an analog signal; and
    a cut-off controller for correcting a color-difference signal in response to the analog signal output from said digital-to-analog converter.

2. An apparatus for correcting a chromaticity diagram by a variable brightness as claimed in claim 1, wherein said first grid voltage detector comprises a transistor having a vertical synchronous signal supplied via a first resistor to its base, a second resistor and a capacitor which are connected to a collector of said transistor, and a third resistor connected to said capacitor.

3. An apparatus for correcting a chromaticity diagram by a variable brightness as claimed in claim 1, wherein said phase inverter includes an operational amplifier, first and second resistors connected in series to an output of said operational amplifier, a third resistor connected to a junction between said first and second resistors, and a Zener diode connected to said third resistor.

4. A method of correcting a chromaticity diagram by a variable brightness comprising the steps of:
    (a) storing a first grid voltage value and a reference RGB bias value during white balance to correct a chromaticity diagram;
    (b) reading the first grid voltage value and storing a correction value of RGB bias according to a first grid voltage change rate, when the first grid and the RGB bias values are stored in said step (a);
    (c) reading the first grid voltage value which is currently operating, when the RGB bias correction value is stored in said step (b);

(d) correcting color tracking by reading each correction value of the corresponding RGB bias assigned by the first grid voltage change rate, when the first grid voltage value is read in said step (c), and adding the read correction value to the currently operating RGB bias value to change a voltage of the bias.

5. An apparatus for correcting a chromaticity diagram by a variable brightness comprising:

a grid voltage regulator for controlling a grid voltage of a first grid of a cathode ray tube to be a voltage of a predetermined level;

a grid voltage detector for detecting the grid voltage of said first grid controlled by said first grid voltage regulator;

means for outputting a phase-inverted voltage signal by changing a polarity of said grid voltage detected by said grid voltage detector;

an analog-to-digital converter for said phase-inverted voltage signal into a digital signal;

a microprocessor for generating error data in response to said digital signal;

a digital-to-analog converter for converting the error data, output from said microprocessor, into an analog signal; and a cut-off controller for receiving the analog signal output from said digital-to-analog converter and for correcting a color-difference signal.

6. An apparatus for correcting a chromaticity diagram by a variable brightness as claimed in claim 5, wherein said grid voltage detector comprises a transistor having a vertical synchronous signal supplied via a first resistor to its base, a second resistor and a capacitor which are commonly connected to a collector of said transistor, and a third resistor connected between said capacitor and said grid voltage regulator.

7. An apparatus for correcting a chromaticity diagram by a variable brightness as claimed in claim 5, wherein said phase inverter includes an operational amplifier for receiving said grid voltage detected by said grid voltage detector, first and second resistors connected in series to an output of said operational amplifier, a third resistor connected to a junction between said first and second resistors, and a Zener diode connected to said third resistor.

8. An apparatus for correcting a chromaticity diagram by a variable brightness as claimed in claim 5, wherein said cut-off controller changes a bias voltage of an RGB electron gun of said cathode ray tube to correct color tracking.

* * * * *